("12") United States Patent
Cohen et al.

(10) Patent No.: US 12,406,038 B1
(45) Date of Patent: *Sep. 2, 2025

(54) SYSTEMS AND METHODS FOR LOCATION-BINDING AUTHENTICATION

(71) Applicant: Wells Fargo Bank, N.A., San Francisco, CA (US)

(72) Inventors: Gerard K. Cohen, Oakland, CA (US); Michelle D. Green, San Francisco, CA (US); Christopher P. Smith, Marvin, NC (US); Craig Stuart, San Francisco, CA (US); Kenneth L. Wright, Charlotte, NC (US); Michelle M. Young, Houston, TX (US)

(73) Assignee: Wells Fargo Bank, N.A., San Francisco, CA (US)

( * ) Notice: Subject to any disclaimer, the term of this patent is extended or adjusted under 35 U.S.C. 154(b) by 260 days.

This patent is subject to a terminal disclaimer.

(21) Appl. No.: 17/486,733

(22) Filed: Sep. 27, 2021

Related U.S. Application Data

(63) Continuation of application No. 15/204,649, filed on Jul. 7, 2016, now Pat. No. 11,132,425.

(51) Int. Cl.
 *G06F 21/31* (2013.01)
 *G06F 21/62* (2013.01)
 *G06Q 20/32* (2012.01)

(52) U.S. Cl.
 CPC .......... *G06F 21/31* (2013.01); *G06F 21/6218* (2013.01); *G06Q 20/3224* (2013.01); *G06Q 20/3276* (2013.01); *G06F 2221/2111* (2013.01)

(58) Field of Classification Search
 CPC ................ G06F 21/31; G06F 21/6218; G06F 2221/2111; G06Q 20/3224; G06Q 20/3276
 See application file for complete search history.

(56) References Cited

U.S. PATENT DOCUMENTS 6,832,721 B2  12/2004  Fujii
6,907,238 B2   6/2005  Leung
(Continued)

FOREIGN PATENT DOCUMENTS

WO  WO-2014/075162  5/2014

OTHER PUBLICATIONS

"Indoor location identification with better outlook through Augmented Reality"; Leeladevi B, Rahul Raj CP, SeshuBabu Tolety; 2014 IEEE International Conference on Advanced Communication Control and Computing Technologies (ICACCCT) (Year: 2014).

(Continued)

*Primary Examiner* — John W Hayes
*Assistant Examiner* — Edgar R. Martinez-Hernandez
(74) *Attorney, Agent, or Firm* — Foley & Lardner LLP

(57) ABSTRACT

Systems, methods, and apparatuses for authenticating a user based at least in part on a location of the user or a location of a user device are described. A method includes: receiving a login request including a user identifier associated with a user; transmitting a request for location information of a user device associated with the user; causing computer-executable code deployed to the user device to generate a location-based modifiable digital fingerprint comprising a first encoded value based on a unique identifier of the user device and a second encoded value based on a first location information of the user device; receiving the location-based modifiable digital fingerprint from the user device; verifying that the location information from the location-based modifiable digital fingerprint corresponds to a second location; and providing the user access to the computing device.

20 Claims, 5 Drawing Sheets

(56) References Cited

U.S. PATENT DOCUMENTS

| | | | |
|---|---|---|---|
| 7,221,949 B2 | 5/2007 | Clough | |
| 7,589,614 B2 | 9/2009 | Xydis | |
| 7,617,542 B2 * | 11/2009 | Vataja | H04L 67/04 342/450 |
| 7,747,535 B2 | 6/2010 | Mikan et al. | |
| 8,166,068 B2 | 4/2012 | Stevens | |
| 8,195,576 B1 | 6/2012 | Grigg et al. | |
| 8,285,639 B2 | 10/2012 | Eden et al. | |
| 8,395,547 B2 * | 3/2013 | Dhanani | H04L 67/52 342/451 |
| 8,401,906 B2 | 3/2013 | Ruckart | |
| 8,464,063 B2 | 6/2013 | Agarwal et al. | |
| 8,566,233 B2 | 10/2013 | Prakash et al. | |
| 8,646,060 B1 | 2/2014 | Ben Ayed | |
| 8,776,246 B2 | 7/2014 | Allegri et al. | |
| 8,818,867 B2 | 8/2014 | Baldwin et al. | |
| 8,850,196 B2 | 9/2014 | Blanco et al. | |
| 8,924,292 B1 | 12/2014 | Ellis et al. | |
| 8,930,271 B1 | 1/2015 | Ellis et al. | |
| 8,938,787 B2 | 1/2015 | Turgeman | |
| 8,948,791 B2 | 2/2015 | Shankaranarayanan et al. | |
| 8,972,297 B2 | 3/2015 | Kay et al. | |
| 8,977,251 B2 | 3/2015 | Grigg et al. | |
| 8,996,867 B2 | 3/2015 | Ji et al. | |
| 9,032,498 B1 | 5/2015 | Ben Ayed | |
| 9,208,301 B2 * | 12/2015 | Grigg | H04W 12/06 |
| 9,591,035 B2 * | 3/2017 | Kuo | H04L 65/1069 |
| 10,050,962 B2 * | 8/2018 | Grigg | H04W 12/68 |
| 11,132,425 B1 * | 9/2021 | Cohen | G06Q 20/4093 |
| 2003/0069820 A1 * | 4/2003 | Hillmer | G06Q 40/00 705/35 |
| 2006/0206709 A1 * | 9/2006 | Labrou | G06Q 20/18 713/167 |
| 2007/0162963 A1 | 7/2007 | Penet et al. | |
| 2007/0174082 A1 | 7/2007 | Singh | |
| 2008/0120711 A1 * | 5/2008 | Dispensa | H04L 63/18 726/5 |
| 2008/0249939 A1 | 10/2008 | Veenstra | |
| 2010/0024017 A1 | 1/2010 | Ashfield et al. | |
| 2010/0333207 A1 * | 12/2010 | Etchegoyen | G06F 21/10 726/26 |
| 2011/0035318 A1 | 2/2011 | Hargrove et al. | |
| 2011/0208601 A1 | 8/2011 | Ferguson et al. | |
| 2012/0167170 A1 | 6/2012 | Shi et al. | |
| 2012/0209686 A1 * | 8/2012 | Horowitz | G06Q 30/0224 705/14.26 |
| 2013/0046691 A1 | 2/2013 | Culton | |
| 2013/0046692 A1 | 2/2013 | Grigg et al. | |
| 2013/0110715 A1 | 5/2013 | Buchhop | |
| 2013/0124422 A1 * | 5/2013 | Hubert | G06Q 20/3827 705/71 |
| 2013/0227651 A1 | 8/2013 | Schultz et al. | |
| 2013/0275303 A1 | 10/2013 | Fiore et al. | |
| 2014/0053250 A1 | 2/2014 | Wethington et al. | |
| 2014/0279490 A1 | 9/2014 | Calman et al. | |
| 2014/0279503 A1 | 9/2014 | Bertanzetti et al. | |
| 2014/0289116 A1 | 9/2014 | Polivanyi | |
| 2014/0337948 A1 * | 11/2014 | Hoyos | G06Q 20/40145 726/7 |
| 2014/0373114 A1 | 12/2014 | Franca-Neto et al. | |
| 2014/0375421 A1 | 12/2014 | Morrison et al. | |
| 2014/0380445 A1 | 12/2014 | Tunnell et al. | |
| 2015/0106268 A1 * | 4/2015 | Carroll | H04W 12/126 705/44 |
| 2015/0149359 A1 * | 5/2015 | Forte | G06Q 20/085 705/44 |
| 2015/0288668 A1 * | 10/2015 | Kupper | H04L 67/306 726/4 |
| 2016/0042263 A1 * | 2/2016 | Gaddam | H04N 1/32117 235/494 |
| 2017/0124564 A1 * | 5/2017 | Pi Farias | G06K 7/10881 |
| 2017/0148241 A1 * | 5/2017 | Kerning | G08B 21/22 |
| 2017/0272155 A1 * | 9/2017 | Olsen | H04B 10/116 |
| 2018/0300364 A1 * | 10/2018 | Xu | G06Q 50/00 |

OTHER PUBLICATIONS

"Mobile User Verification/Identification using Statistical Mobility Profile"; Miao Lin, Hong Cao, Vincent Zheng, Kevin C. Chang, Shonali Krishnaswamy; (Year: 2015).

Albatram, et al., A Location-Based Authentication System Leveraging Smartphones, 2014 IEEE 15th International Conference on Mobile Data Management (MDM), vol. 1, Jul. 2014, IEEE, 6 pages.

Berbecaru, D., Lrap: A Location-Based Remote Client Authentication Protocol for Mobile Environments, 2011 19th International Euromicro Conference on Parallel, Distributed and Network-Based Processing (PDP), Feb. 2011, IEEE, 5 pages.

Bertino, et al., Location-Aware Authentication and Access Control-Concepts and Issues, 2009 International Conference on Advanced Information Networking and Applications, AINA '09, May 2009, IEEE, 6 pages.

Fan, et al., On The Security of Password-Based Pairing Protocol in Bluetooth, 13th Asia-Pacific Network Operations and Management Symposium (APNOMS), Sep. 2011, IEEE, 4 pages.

Hsieh, et al., Design of a Time and Location Based One-Time Password Authentication Scheme, 2011 7th International Wireless Communications and Mobile Computing Conference (IWCMC), Jul. 2011, IEEE, 6 pages.

Hua, et al., A Location Authentication Scheme Based On Adjacent Users, 2014 International Conference on Progress in Informatics and Computing (PIC), May 2014, IEEE, 5 pages.

Jaros, et al., New Location-based Authentication Techniques in the Access Management, 2010 6th International Conference on Wireless and Mobile Communications (ICWMC), Sep. 2010, IEEE, 5 pages.

Zhang, et al., Location-based Authentication and Authorization Using Smart Phones, 2012 IEEE 11th International Conference on Trust, Security, and Privacy in Computing and Communications (TrustCom), Jun. 2012, IEEE, 8 pages.

* cited by examiner

| Device ID: | 1X478VH390184JJ3 |
|---|---|
| Time: | MARCH 3, 2016 15:34 EST |
| | |
| LOCATION SNAPSHOT ||
| | |
| GPS Sat | Distance |
| 9 | ##### |
| 30 | ##### |
| 23 | ##### |
| 28 | ##### |
| | |
| WiFi SSID | Strength |
| Coffee Shop | -64.3db |
| Work-Private | -68.4db |
| Work-Guest | -68.4db |
| Apartment12 | -61.2db |
| | |
| Bluetooth Beacon ID ||
| 132DF5432H12323 ||
| | |
| Other ||
| QR Code | 12345WORKPLACE |
| NFC Tag ID | N/A |

FIG. 3

SYSTEMS AND METHODS FOR LOCATION-BINDING AUTHENTICATION

CROSS-REFERENCE TO RELATED PATENT APPLICATIONS

This application is a continuation of U.S. patent application Ser. No. 15/204,649, filed Jul. 7, 2016, now U.S. Pat. No. 11,132,425, which is incorporated herein by reference in its entirety.

TECHNICAL FIELD

Embodiments of the present disclosure relate to systems and methods for using location-based authentication.

BACKGROUND

Many systems require users to authenticate themselves prior to gaining access to the system. For example, many financial institutions provide online services to their customers via online banking portals and mobile banking applications that allow the customers to remotely manage their financial accounts and complete various financial transactions through internet after the customers are fully authenticated. Additionally, many employers require that their employees authenticate themselves via employee work terminals (e.g., computers, laptops, etc.) prior to providing access to the underlying system. The user authentication is required to protect user privacy and to reduce fraud. Many authentication processes may require inputs of authentication codes, such as passwords, PINs, authentication codes (e.g., dynamically generated security token), biometrics, security question answers, etc.

SUMMARY

A first example embodiment relates to a method of authenticating a login request at a computing device. The method includes receiving, at an authentication system associated with the computing device, a login request from the computing device. The login request includes a user identifier associated with the user. The method further includes transmitting, by the authentication system, a request for location information of a user device associated with the user. The method includes receiving, by the authentication system, location information from the user device. The method further includes verifying, by the authentication system, that the location information received from the user device corresponds to a known location of the computing device. The method includes providing, by the authentication system, the user access to the computing device.

Another example embodiment relates to a system. The system includes a computing device and a backend authentication system in communication with the computing device via a network. The backend authentication system includes a processing circuit having a processor and memory. The processing circuit is structured to receive a login request from the computing device. The login request includes a user identifier associated with a user attempting to gain access to the computing device. The processing circuit is further structured to transmit a request for location information to a user device associated with the user. The processing circuit is structured to receive location information from the user device. The processing circuit is further structured to verify that the location information received from the user device corresponds to a known location of the computing device and to provide the user access to the computing device.

A further example embodiment relates to a method of authenticating a transaction request involving an originator and a recipient. The method includes receiving, by a financial institution computing system associated with a financial institution where the originator maintains an account involved in the transaction, a transaction request. The method further includes transmitting, by the financial institution computing system, a request for location information to a user device associated with the originator. The method includes receiving, by the financial institution computing system, location information from the user device. The method further includes verifying, by the financial institution computing system, that the location information received from the user device corresponds to an approved location for the transaction. The method includes approving, by the financial institution computing system, the transaction.

Another example embodiment relates to a financial institution computing system associated with a financial institution. The system includes a network interface structured to facilitate data communication via a network. The system further includes an accounts database structured to store information associated with accounts held by the financial institution. The system includes a processing circuit comprising a processor and memory. The processing circuit is structured to receive a transaction request relating to a transaction involving a transfer of funds from an originator to a recipient, the originator having an account with the financial institution. The processing circuit is further structured to transmit a request for location information to a user device associated with the originator. The processing circuit is structured to receive location information from the user device. The processing circuit is further structured to verify that the location information received from the user device corresponds to an approved location for the transaction and to approve the transaction.

These and other features, together with the organization and manner of operation thereof, will become apparent from the following detailed description when taken in conjunction with the accompanying drawings.

BRIEF DESCRIPTION OF THE FIGURES

FIG. 3 shows a table of information used to form a digital fingerprint of a user device of the system of FIG. 1 or the system of FIG. 2.

DETAILED DESCRIPTION

Referring to the figures generally, systems, methods, and apparatuses for authenticating a user based at least in part on a location of the user or a location of a user device are described herein. The user may be authenticated as part of a financial transaction or as part of a login process for a computing device. The user device was previously bound or associated with the user. During the authentication, a system (e.g., a financial institution computing system or a backend authentication system) requests location information from the user device. The location information may be packaged as a digital fingerprint of the user device, which can only be created from the user device. Based on the location information, the user can be authenticated thereby approving the transaction or login request.

Figure 1:
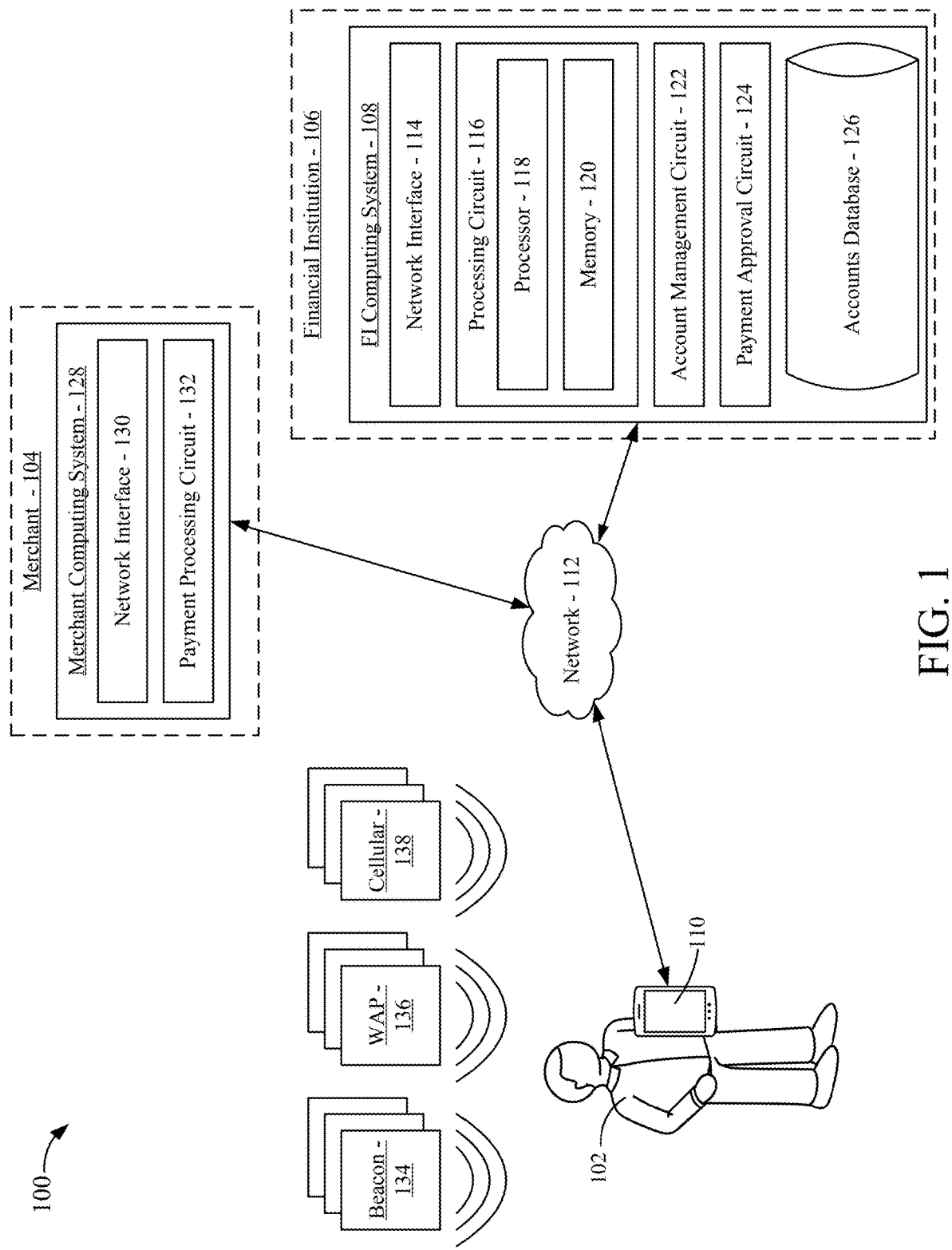
FIG. 1 is a view of a system that facilitates a transfer of funds from a user to a recipient according to an example embodiment.

Referring to FIG. 1, a view of a system 100 is shown according to an example embodiment. As described below in further detail, the system 100 facilitates a transfer of funds from a user 102 to a recipient. In the specific arrangement of FIG. 1, the recipient is a merchant 104, and the transfer of funds is described within the context of a purchase by the user 102 from the merchant 104 (e.g., an online purchase). The transfer of funds is facilitated by a financial institution 106. It should be understood that the merchant 104 may be replaced with any type of entity that receives funds from the user 102 (e.g., a financial institution that receives funds from the user 102 in a transfer between financial institutions not necessarily in connection with the purchase of goods or services).

The user 102 is an account holder with the financial institution 106. The financial institution 106 includes a financial institution (FI) computing system 108. The FI computing system 108. The FI computing system 108 maintains information about accounts held with the financial institution 106 and facilitates the movement of funds into and out of the accounts. The user 102 can manage and maintain (e.g., view balances, initiate transfers, change contact information, etc.) the account with the financial institution 106 via the user device 110. The user device 110 may be a mobile device (e.g., a smartphone, a tablet computer), a laptop computer, a desktop computer, or the like. Accordingly, the user 102 can access the finance institution computing system 108 through a website associated with the financial institution 106 (e.g., via a web browser being executed on the user device 110) or a banking application offered by the financial institution 106 and being executed on the user device 110. The user device 110 communicates with the FI computing system 108 via a network 112. In some arrangements, the network 112 includes the Internet.

The financial institution computing system 108 includes a network interface 114. The network interface 114 is structured to facilitate data communication with other computing systems (e.g., the user device 110) via the network 112. The network interface 114 includes hardware and program logic that facilitates connection of the FI computing system 108 to the network 112. For example, the network interface 114 may include a wireless network transceiver (e.g., a cellular modem, a Bluetooth transceiver, a WiFi transceiver, etc.) and/or a wired network transceiver (e.g., an Ethernet transceiver). In some arrangements, the network interface 114 includes the hardware and programming logic sufficient to support communication over multiple channels of data communication (e.g., the Internet and an internal financial institution network). Further, in some arrangements, the network interface 114 is structured to encrypt data sent over the network 112 and decrypt received encrypted data.

The financial institution computing system 108 includes a processing circuit 116 having a processor 118 and memory 120. The processor 118 may be implemented as a general-purpose processor, an application specific integrated circuit (ASIC), one or more field programmable gate arrays (FPGAs), a digital signal processor (DSP), a group of processing components, or other suitable electronic processing components. The memory 120 includes one or more memory devices (e.g., RAM, NVRAM, ROM, Flash Memory, hard disk storage, etc.) that store data and/or computer code for facilitating the various processes described herein. Moreover, the memory 120 may be or include tangible, non-transient volatile memory or non-volatile memory.

The FI computing system 106 includes an account management circuit 122 and a payment approval circuit 124. Although shown as separate circuits in FIG. 1, in some arrangements, the account management circuit 122 and/or the payment approval circuit 124 are part of the processing circuit 116. Other arrangements may include more or less circuits without departing from the spirit and scope of the present disclosure. Further, some arrangements may combine the activities of one circuit with another circuit to form a single circuit. Therefore, those of ordinary skill in the art will appreciate that the present arrangement is not meant to be limiting. The account management circuit 122 is structured to perform various account management functions, including maintaining an accounts database 118, updating account balances, applying interest to accounts, processing payments related to accounts, and the like. The payment approval circuit 124 is structured to approve payment requests relating transfers of funds out of accounts associated with customers (e.g., the user 102).

The FI computing system 106 includes the accounts database 126. In some arrangements, the accounts database 126 is part of the memory 120. The accounts database 126 is structured to hold, store, categorize, and otherwise serve as a repository for information associated with accounts (e.g., loan accounts, savings accounts, checking accounts, credit accounts, etc.) held by the financial institution 106. For example, the accounts database 126 may store account numbers, account balances, account ownership information, and the like. The accounts database 126 is structured to selectively provide access to information relating to accounts at the financial institution 106 (e.g., to the user 102 via the user device 110).

Still referring to FIG. 1, the merchant 104 is associated with a merchant computing system 128. The merchant computing system 128 is generally structured to process payments associated with purchases and returns from the merchant 104 (e.g., a payment associated with a purchase by the user 102 from the merchant 104). The merchant computing system 128 includes a network interface 130 and a payment processing circuit 132. The network interface 130 is structured to facilitate data communication with other computing systems (e.g., the user device 110, the FI computing system 108, etc.) via the network 112. The network interface 130 includes hardware and program logic that facilitates connection of the merchant computing system 128 to the network 112 in a similar manner as described above with respect to the network interface 114 of the FI computing system 108. The payment processing circuit 132 is structured to receive payment information (e.g., credit card information, checking account information, math-based currency information, etc.) from customers (e.g., the user 102) and computing devices associated with customers (e.g., the user device 110), and to forward the payment information to a payment processor (e.g., the FI computing system 108, a credit card network computing system, a payment network computing system, etc.) as a payment request. Additionally, the payment processing circuit 132 is structured to receive approvals and denials from the payment processor associated with payment requests.

As described in further detail below with respect to FIG. 4, the FI computing system 106 is generally structured to authorize a transaction associated with the user 102 (e.g., a purchase by the customer from the merchant 104, a transfer of funds, etc.) based at least in part on the location of the user device 110. Accordingly, the user device 110 is structured to receive location information from various location devices and to transmit the location information to the FI computing system 108 via the network 112. In some arrangements, the location devices include at least one locator beacon 134. Each locator beacon 134 is structured to wirelessly transmit a unique identifier via a wireless transmitter (e.g., a Bluetooth transmitter). When the user device 110 is within a broadcast range of a given locator beacon 134, the user device 110 can receive the locator beacon, and the location of the user device 110 can be determined (either locally by the user device 110 or remotely by the FI computing system 108) by cross-referencing the received unique identifier with a location database. In other arrangements, the location device includes at least one wireless access point ("WAP") 136. A WAP 136 may be, for example, a wireless router, a WAP associated with a business, or the like. The WAP 136 broadcasts a network identifier (e.g., an SSID), which is received by the user device 110 when the user device 110 is within a broadcast range of a given WAP 136. If the user device 110 receives the network identifier, the location of the user device 110 can be determined (either locally by the user device 110 or remotely by the FI computing system 108) by cross-referencing the received network identifier with a location database. In further arrangements, the location device includes at least one cellular transceiver 138. Similar to the beacon 134 and the WAP 136, the cellular transceiver 138 (e.g., a cell tower) transmits a unique cellular identifier. Accordingly, when the user device 110 is within broadcast range of the cellular transceiver 138, the user device 110 is known to be within the vicinity of the cellular transceiver 138. In further arrangements, the location devices include a combination of locator beacons 134, WAPs 136, and cellular transceivers 138. Although the system 100 only shows locator beacons 134, WAPs 136, and cellular transceivers 138, it should be understood that the user device 110 can receive location information from other sources, such as scanning a barcode or QR code displayed on a device having a known and fixed location, from GPS (or similar system) satellites, and the like.

The location information used by the FI computing system 106 may be received in the form of a digital fingerprint of the user device. The digital fingerprint is formed by a combination of device identifier information (e.g., a device serial number associated with the user device 110) and location information associated with the user device 110. Accordingly, the digital fingerprint changes depending on the location of the user device 110. The location information may be formed by a received wireless signals (e.g., from any beacons 134, WAPs 136, or cellular transceivers 138 in broadcast range of the user device 110), codes scanned from a designated location (e.g., a QR code scanned by the user device 110 from the screen of the computing device 202 or another known location), or the like. Since the digital fingerprint is specific to the user device 110, the digital fingerprint is difficult for a fraudster attempting to transfer funds to spoof.

Figure 2:
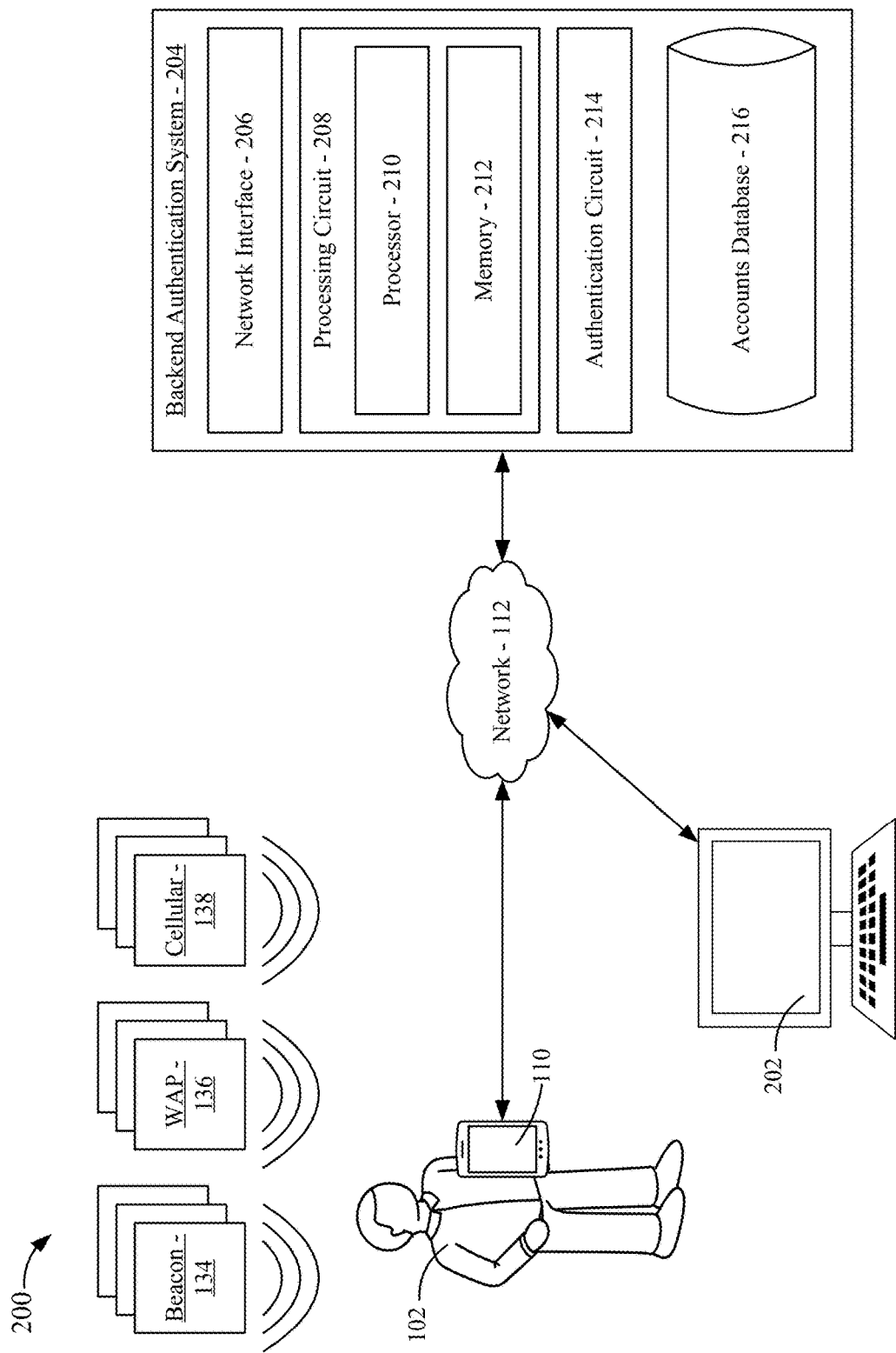
FIG. 2 is a view of a user authentication system according to an example embodiment.

Referring to FIG. 2, a view of a user authentication system 200 is shown according to an example embodiment. The user authentication system 200 is similar to the system 100. Accordingly, like numbering is maintained between FIG. 1 and FIG. 2 to designate like objects between the systems 100 and 200. The primary difference between the system 100 and the system 200 is that the system 200 facilitates the authentication of the user 102 to a computing device 202 instead of facilitating the authentication of the user 102 as the originator of a transfer of funds (as done in the system 100). The computing device 202 may be, for example, a work-access terminal, a personal computing device, a financial institution computing device, or the like. For example, the user 102 may be an employee attempting to gain access to a workstation (i.e., the computing device 202) at the user's workplace.

Generally, to access the computing device 202, the user 102 must authenticate himself as an authorized user of the computing device 202. For example, if the user 102 is an employee and the computing device 202 is an employer work terminal, the user 102 must authenticate that the user is an employee who has access rights to the work terminal. This is traditionally achieved by the user 102 providing authentication information (e.g., username, password, token, biometric, etc.) to the computing device 202 which is either verified locally at the computing device 202 or remotely by a backend authentication system 204. If the provided authentication information matches verified authentication information, the user 102 is provided access to the computing device 202. However, authentication credentials can be easily spoofed by a person that is not authorized to access the computing device 202 (e.g., a hacker, a criminal, etc.). To add an additional or alternate authentication layer to the user authentication process, the system 200 additionally or alternatively relies on a digital fingerprint of a user device 110 known to be associated with the user 102. The digital fingerprint is formed by a combination of device identifier information (e.g., a device serial number associated with the user device 110) and location information associated with the user device 110. Accordingly, the digital fingerprint changes depending on the location of the user device 110. The location information may be formed by a received wireless signals (e.g., from any beacons 134, WAPs 136, or cellular transceivers 138 in broadcast range of the user device 110), codes scanned from a designated location (e.g., a QR code scanned by the user device 110 from the screen of the computing device 202 or another known location), or the like. At the time of user authentication at the computing device 202, the user device 110 provides a digital fingerprint at the same time which is verified as corresponding to the location of the computing device 202. If any of the digital fingerprint or the user authentication information is not verified, the user 102 is not provided access to the computing device 202. Since the digital fingerprint of the user device 110 is specific to the location of the computing device 202, the digital fingerprint is difficult for an unauthorized user to spoof while attempting to gain unauthorized access to the computing device 202. The authentication process is described in further detail below with respect to FIG. 5.

As noted above, the system 200 includes the backend authentication system 204. The backend authentication system 204 includes a network interface 206. The network interface 206 is structured to facilitate data communication with other computing systems (e.g., the user device 110, the computing device 202, etc.) via the network 112. The network interface 206 includes hardware and program logic that facilitates connection of the backend authentication system 204 to the network 112. For example, the network interface 206 may include a wireless network transceiver (e.g., a cellular modem, a Bluetooth transceiver, a WiFi transceiver, etc.) and/or a wired network transceiver (e.g., an Ethernet transceiver). In some arrangements, the network interface 206 includes the hardware and programming logic sufficient to support communication over multiple channels of data communication (e.g., the Internet and an internal private network). Further, in some arrangements, the network interface 206 is structured to encrypt data sent over the network 112 and decrypt received encrypted data.

The backend authentication system 204 includes a processing circuit 208 having a processor 210 and memory 212. The processor 210 may be implemented as a general-purpose processor, an application specific integrated circuit (ASIC), one or more field programmable gate arrays (FPGAs), a digital signal processor (DSP), a group of processing components, or other suitable electronic processing components. The memory 212 includes one or more memory devices (e.g., RAM, NVRAM, ROM, Flash Memory, hard disk storage, etc.) that store data and/or computer code for facilitating the various processes described herein. Moreover, the memory 120 may be or include tangible, non-transient volatile memory or non-volatile memory.

The backend authentication system 204 includes an authentication circuit 214. Although shown as separate circuits in FIG. 2, in some arrangements, the authentication circuit 214 is part of the processing circuit 208. Other arrangements may include more or less circuits without departing from the spirit and scope of the present disclosure. Further, some arrangements may combine the activities of one circuit with another circuit to form a single circuit. Therefore, those of ordinary skill in the art will appreciate that the present arrangement is not meant to be limiting. The authentication circuit 214 is structured to authentication individuals attempting to access the computing device 202.

The backend authentication system 204 includes an accounts database 216. In some arrangements, the accounts database 216 is part of the memory 212. The accounts database 216 is configured to hold, store, categorize, and otherwise serve as a repository for information associated with user accounts permitted to access the computing device 202. For example, the accounts database 216 may store user identifiers, user passwords, user biometric information, user device information (e.g., the serial numbers of user devices associated with authorized users of the computing device 202), verified user device digital fingerprint information, and the like. The accounts database 216 is accessed by the authentication circuit 214 during authentication of a user attempting to access the computing device 202.

In an alternative arrangement, the functionality of the backend authentication system 204 is incorporated directly into the computing device 202. In such an arrangement, the user authentication information and the digital fingerprint of the user device 110 are provided to the computing device 202 and verified locally at the computing device 202.

Referring to FIG. 3, a table 300 showing information used to form a digital fingerprint of the user device 110 is shown. The digital fingerprint includes information that is gathered by the user device 110. The digital fingerprint includes a device identifier 302 and a time 304 of the digital fingerprint. The device identifier 302 is a unique identifier that is associated with the user device 110. The device identifier 302 may be, for example, an electronic serial number ("ESN"), an international mobile station equipment identity ("IMEI"), a mobile equipment identifier ("MEID"), a media access control address ("MAC address"), or the like. The time 304 may correspond to a device time maintained by the user device 110 or an externally maintained time. In some arrangements, the time 304 includes a date and a time.

The digital fingerprint includes a location snapshot 306 of the user device 110. The location snapshot 306 is formed from various location information received at the user device 110 at the time 304 associated with the digital fingerprint. The location snapshot 306 is formed from any combination of GPS satellite information 308, WiFi SSID information 310, locator beacon identifiers 312, and other locator information (e.g., scanned QR code information 314, scanned NFC tag identifiers 316, etc.). The information listed in the table 300 is not intended to be limiting to the types of information that may be used to generate a digital fingerprint. For example, additional location information can be used to form the location snapshot 306, such as GLONASS satellite information, cellular tower information (e.g., from cellular transceiver 138), image information, and the like.

In some arrangements, the table 300 constitutes the digital fingerprint. In such arrangements, the user device 110 can transmit the table 300 to a receiving device (e.g., the FI computing system 108, the backend authentication system 204, the computing device 202, etc.). In other arrangements, the table 300 is used by the user device 110 to generate a digital fingerprint. In such arrangements, the user device 110 transforms the information contained in the table 300 to create an alpha-numeric string that represents the information in the table 300 (e.g., by hashing the information contained in the table 300). In both arrangements, the digital fingerprint may be encrypted by the user device 110 prior to transmission to the receiving device.

Figure 4:
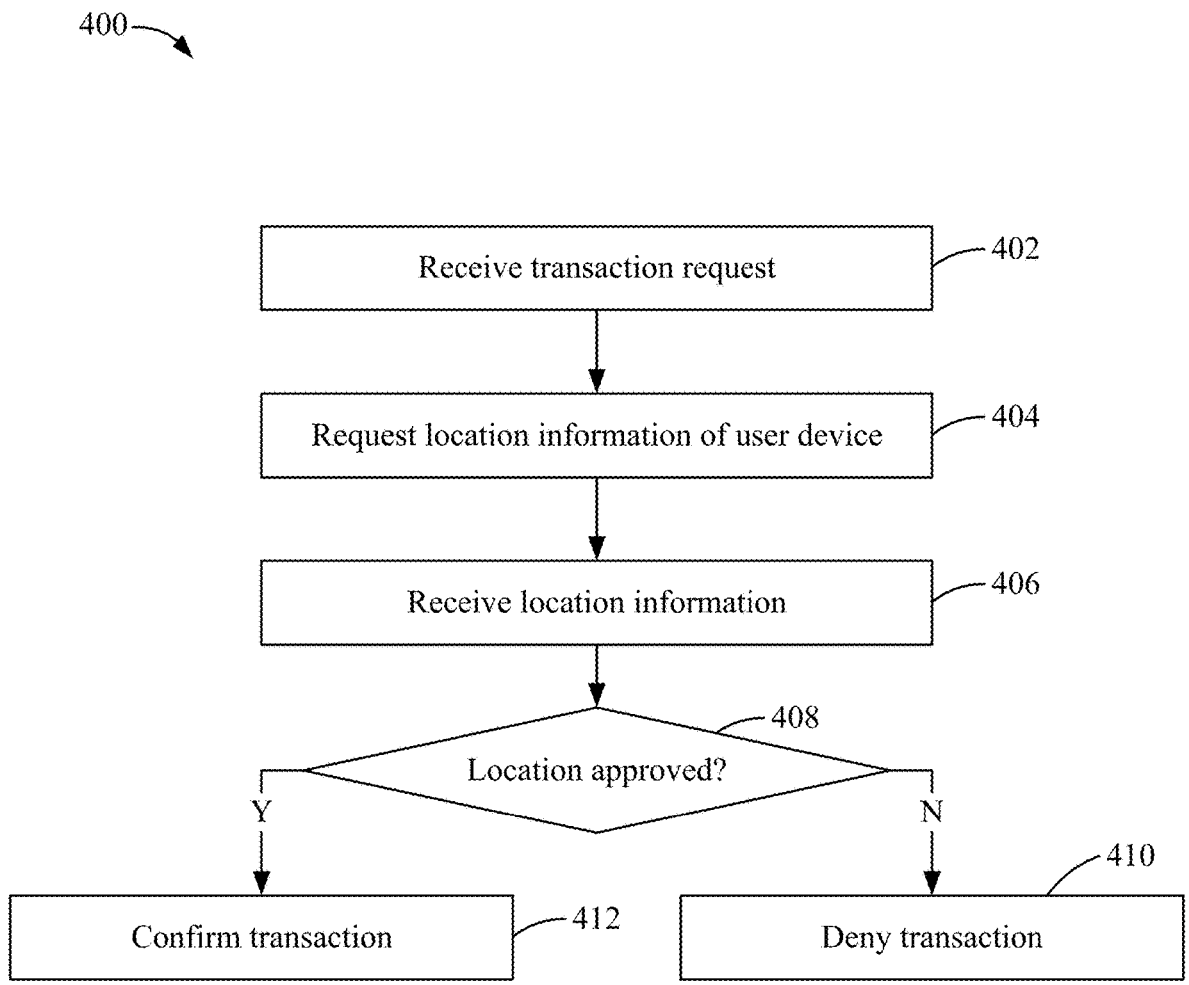
FIG. 4 is a flow diagram of a method of authenticating a financial transaction according to an example embodiment.

Referring to FIG. 4, a flow diagram of a method 400 of authenticating a financial transaction is shown according to an example embodiment. The method 400 is performed by the FI computing system 108 in the context of the system 100. Specifically, the method 400 is performed by the payment approval circuit 124 of the FI computing system 108. In some arrangements, the method 400 is performed during a transaction between the user 102 and the merchant 104. In other arrangements, the method 400 is performed during a transaction in which the user 102 is providing payment to another entity (e.g., during a transfer of funds, during a purchase, during a donation, etc.). The other entity may be another financial institution.

The method 400 begins when a transaction request is received at 402. The transaction request is received by the FI computing system 108 via the network 112. In some arrangements, the transaction request relates to a transaction (e.g., a purchase) between the user 102 and the merchant 104. In such arrangements, the FI computing system 108 receives the transaction request from the merchant computing system 128 or from a payment processing computing system (e.g., a point-of-sale system associated with the merchant 104, a payment network computing system, etc.). In other arrangements, the transaction request relates to a transaction involving the transfer of funds out of an account associated with the user 102 to a destination (e.g., another account at another financial institution, an account associated with another individual or company, etc.). The transfer of funds may be associated with a wire transfer, a peer-to-peer payment, an ACH transfer, or the like. In such arrangements, the FI computing system 108 receives the transaction request from an initiating computing device (e.g., the user device 110, a tablet computer, a laptop/desktop, a work computer, an ATM, a teller computing system, etc.) accessed by the user 102 or on behalf of the user 102. The initiating computing device allows the user 102 (or an individual) to perform transactions associated with accounts held at the financial institution 106. The transaction request includes information relating to the transaction, such as amount of money involved in the transaction, an identity of the user 102, an identity of the requestor (if the requestor is other than the user 102), an identity of the destination, and the like.

In some arrangements, the method 400—particularly steps 404 through 410—are only performed if a transaction condition is met. The condition may relate to the amount of money involved in the transaction being above a threshold amount or if the transaction is flagged as potentially fraudulent. In such arrangements, the information associated with the transaction received with the transaction request at 402 is compared against the threshold amount or for potential fraud indicators before proceeding to step 404. In further arrangements, the condition may relate to the transaction occurring at a designated period of time (e.g., a certain period of the week, a designated date, a designated time window, etc.), the transaction causing the number of transactions to exceed a designated amount of transactions during a time period (e.g., the transaction is the tenth transaction to occur in the same day), the type of transaction occurring (e.g., purchase vs. return), the transaction occurring during a user-indicated travel period, or the like. In other arrangements, all transactions associated with the user 102 or the account involved with the transaction are processed via the method 400. The description of the method 400 continues under the assumption that the transaction is processed via the method 400.

Location information of the user device is requested at 404. The FI computing system 108 transmits a request to the user device 110 associated with the user 102 that owns the account involved in the transaction. The user device 110 was previously bound or registered to the customer's account (e.g., by downloading a mobile banking application and completing the sign in process for the first time, by registering the user device 110 with the FI computing system 108, etc.). In some arrangements, the requested location information relates to a current digital fingerprint of the user device 110 (e.g., as described above with respect to FIG. 3). In other arrangements, the request causes the user 102 to be prompted via the user device 110 to enter location information (e.g., by scanning a QR code, by scanning an RFID tag, etc.). The location information may be static (e.g., a QR code that remains the same that is stored at a verified location of the user) or dynamic. For example, the financial institution 106 may request that the user log into an internet-banking website associated with the financial institution 106 where a dynamic transaction code (e.g., QR code) is presented for the user 102 to scan via the user device 110. The location information is used to verify that the user 102 is at an approved location during the transaction (e.g., a location where the user 102 can access the financial institution's website, a location where the user 102 has authorized transactions, such as the user's home or work, a location associated with the merchant 104, etc.). In some arrangements, if the user 102 did not initiate the transaction, the user 102 can respond to the inquiry from the FI computing system 108 to deny the transaction and to trigger a fraud alert or inquiry.

Location information is received from the user device at 406. The FI computing system 108 receives the location information from the user device 110 via the network 112. In some arrangements, the location information is encrypted. In such arrangements, the FI computing system 108 decrypts the encrypted location information. The FI computing system 108 determines whether the location information received at 406 corresponds to an approved location at 408. The FI computing system 108 compares the received location information with expected or verified location information to determine whether there is a match.

If the location information does not correspond to an approved location, the transaction is denied at 410. If the location information does not match the verified or expected location information, the transaction is denied. For example, if the expected location information relates to a known dynamic QR code, and the received location information includes a different code or no code, the location information does not correspond to an approved location. As another example, if the transaction is originating at a location of the merchant 104 (e.g., at a store), and the location information provided by the user device 110 corresponds with the user 102 being in a different location (e.g., at home, at work, in a different city, etc.), the location information does not correspond to an approved location. After the transaction is denied, the FI computing system 108 may send an alert to the user 102 to inform the user that a transaction associated with the user's account was attempted and denied.

If the location information corresponds to an approved location, the transaction is approved at 412. The FI computing system 108 transmits an approval message to the transaction requestor (e.g., to the merchant point of sale system, to the user 102 via the user device 110, etc.), and begins processing the transaction. In some arrangements, the FI computing system 108 initiates a transfer of funds (e.g., via ACH, via wire, etc.) in response to approving the transaction.

Figure 5:
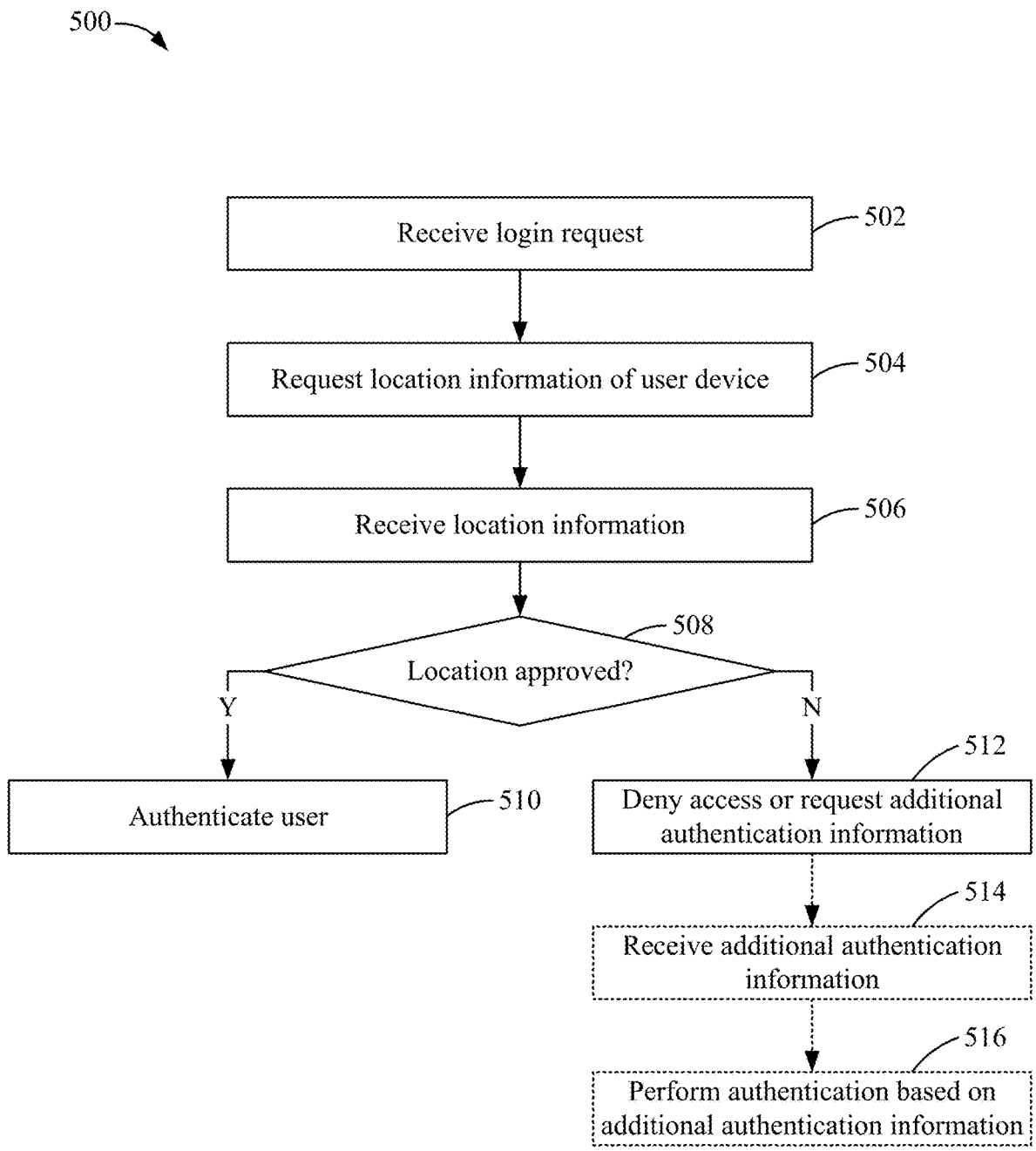
FIG. 5 is a flow diagram of a method of authenticating a user according to an example embodiment.

Referring to FIG. 5, a flow diagram of a method 500 of authenticating a user is shown according to an example embodiment. The method 500 is performed by the backend authentication system 204. Specifically, the method 500 is performed by the authentication circuit 214 of the backend authentication system 204. The method 500 is used to authenticate the user 102 at a computing device 202 (e.g., an employee workstation) based on user-provided authentication credentials and based on location information provided by a user device 110 associated with the user 102.

The method 500 begins with a login request is received at 502. The login request is initiated by the user 102 at the computing device 202. The backend authentication system 204 receives the login request from the computing device 202 via the network 112. The login request includes at least a user identifier associated with the user 102. For example, the login request may include a username, a user token, a user biometric, or the like. In some arrangements, the login request also includes at least one additional authentication factor, such as a password, a token, a biometric, a quasi-randomly generated number, or a combination thereof.

Location information is requested from the user device at 504. The backend authentication system 204 cross-references the accounts database 216 to verify the information provided with the login request as corresponding to known and verified information relating to the user 102. If the information provided does not match the known and verified information, the method 500 ends and the user 102 (or person attempting to impersonate the user 102) is not provided access to the computing device 202. However, the description of the method continues under the presumption that the provided information at 502 is valid. At this point, the backend authentication system 204 performs a location check on a user device 110 associated with the user 102 (e.g., the user's smartphone) to verify that the user device 110 is also in the location of the computing device 202. If the user device 110 is in a completely different location, there is a chance that the user 102 is also in the different location, and that the login attempt originates from a fraudster. Accordingly, the backend authentication system 204 transmits a request to the user device 110 associated with the user 102 attempting to login to the computing device 202. The user device 110 was previously bound or registered to the user 102 (e.g., during employee orientation, by binding the device during a prior login, etc.).

In some arrangements, the requested location information relates to a current digital fingerprint of the user device 110 (e.g., as described above with respect to FIG. 3). In other arrangements, the request causes the user 102 to be prompted via the user device 110 to enter location information (e.g., by scanning a three-dimensional barcode such as a QR code, by scanning an RFID tag, etc.). The location information may be static (e.g., a QR code that remains the same that is stored at the location of the computing device 202) or dynamic. For example, the computing device 202 display may present a dynamic transaction code (e.g., QR code) that is generated by and synchronized with the backend authentication system 204 that is presented for the user 102 to scan via the user device 110. The location information is used to verify that the user 102 is at the location of the computing device 202. In some arrangements, if the user 102 did not initiate the login request, the user 102 can respond to the inquiry from the backend authentication system 204 to deny that the user 102 originated the login request and to trigger a fraud alert or inquiry. The user's indication that the user 102 did not initiate the login request, the login request information may be used as a data point to improve the intelligence of a fraud detection system (e.g., by identifying the IP address of a computer responsible for the fraudulent login request, by blacklisting the IP address of the computer responsible for the fraudulent login request, etc.).

Location information is received at 506. The backend authentication system 204 receives the location information from the user device 110 via the network 112. In some arrangements, the location information is encrypted. In such arrangements, the backend authentication system 204 decrypts the encrypted location information. The backend authentication system 204 determines whether the location information corresponds to an approved location at 508. The backend authentication system 204 compares the received location information with expected or verified location information to determine whether there is a match. For example, if the location information relates a digital fingerprint of the user device 110, the backend authentication system 204 compares the received digital fingerprint with a known digital fingerprint (e.g., ensuring that the provided WiFi SSIDs, GPS signals, Bluetooth beacon identifiers, etc. match those of a previously registered and verified digital fingerprint associated with the user device 110). As another example, if the location information relates to a scanned code, the backend authentication system 204 compares the received scanned code with the known code.

If the location information corresponds to an approved location, the user is authenticated at 510. The backend authentication system 204 sends an authorization signal to the computing device 202, and the computing device 202 provides the user 102 access to the computing device 202. After access is provided, the method 500 ends.

If the location information does not correspond to an approved location, the method 500 continues down one of two branches at 512. In the first branch of method 500, the person attempting to access the computing device 202 is denied access to the computing device at 512. In such arrangements, the backend authentication system 204 prevents the user 102 (or the person purporting to be the user 102) from accessing the computing device 202. The method 500 ends if access is denied to the user 102.

In the second branch, the method 500 does not immediately end. Rather, additional authentication information is requested at 512. In such arrangements, the backend authentication system 204 requests additional authentication information from the user 102 (or the person purporting to be the user 102) via the display of the computing device 202. The additional authentication information may relate to, for example, a password associated with the user 102, a biometric associated with the user 102, the answer to a security question known by the user, or a combination thereof. This arrangement accounts for situations in which the user 102 leaves the user device 110 at a different location (e.g., if the user 102 leaves his smartphone at home but the user 102 is at the office). At 514, the requested additional authentication information is received. The backend authentication system 204 receives the authentication information from the user 102 via the computing device. The backend authentication system 204 then authenticates the user based on the additional authentication information at 516. If the provided information matches known and verified information, the user 102 is granted access to the computing device 202, and the method 500 ends. If the provided information does not match known and verified information, the user 102 (or the person purporting to be the user 102) is denied access to the computing device 202, and the method 500 ends.

In an alternative arrangement, the computing device 202 is capable of self-authenticating the user in the same manner as described above with the backend authenticating system 204. In such arrangements, the computing device 202 performs the steps of the method 500.

The above-described authentication systems and methods provide for more secure transactions and more secure computer access systems. The systems and methods utilize location information related to a user device associated with a user involved with a transaction or login attempt. The location information may be packaged as a digital fingerprint, which can only be recreated by the specific user device associated with the user. Accordingly, the digital fingerprint is difficult—if not impossible—to spoof by a fraudster or by another device associated with the fraudster.

The embodiments described herein have been described with reference to drawings. The drawings illustrate certain details of specific embodiments that implement the systems, methods and programs described herein. However, describing the embodiments with drawings should not be construed as imposing on the disclosure any limitations that may be present in the drawings.

It should be understood that no claim element herein is to be construed under the provisions of 35 U.S.C. § 112(f), unless the element is expressly recited using the phrase "means for."

As used herein, the term "circuit" may include hardware structured to execute the functions described herein. In some embodiments, each respective "circuit" may include machine-readable media for configuring the hardware to execute the functions described herein. The circuit may be embodied as one or more circuitry components including, but not limited to, processing circuitry, network interfaces, peripheral devices, input devices, output devices, sensors, etc. In some embodiments, a circuit may take the form of one or more analog circuits, electronic circuits (e.g., integrated circuits (IC), discrete circuits, system on a chip (SOCs) circuits, etc.), telecommunication circuits, hybrid circuits, and any other type of "circuit." In this regard, the "circuit" may include any type of component for accomplishing or facilitating achievement of the operations described herein. For example, a circuit as described herein may include one or more transistors, logic gates (e.g., NAND, AND, NOR, OR, XOR, NOT, XNOR, etc.), resistors, multiplexers, registers, capacitors, inductors, diodes, wiring, and so on).

The "circuit" may also include one or more dedicated processors communicatively coupled to one or more dedicated memory or memory devices. In this regard, the one or more dedicated processors may execute instructions stored in the dedicated memory or may execute instructions otherwise accessible to the one or more dedicated processors. In some embodiments, the one or more dedicated processors may be embodied in various ways. The one or more dedicated processors may be constructed in a manner sufficient to perform at least the operations described herein. In some embodiments, the one or more dedicated processors may be shared by multiple circuits (e.g., circuit A and circuit B may comprise or otherwise share the same processor which, in some example embodiments, may execute instructions stored, or otherwise accessed, via different areas of memory). Alternatively or additionally, the one or more dedicated processors may be structured to perform or otherwise execute certain operations independent of one or more co-processors. In other example embodiments, two or more processors may be coupled via a bus to enable independent, parallel, pipelined, or multi-threaded instruction execution. Each processor may be implemented as one or more general-purpose processors, application specific integrated circuits (ASICs), field programmable gate arrays (FPGAs), digital signal processors (DSPs), or other suitable electronic data processing components structured to execute instructions provided by memory. The one or more dedicated processors may take the form of a single core processor, multi-core processor (e.g., a dual core processor, triple core processor, quad core processor, etc.), microprocessor, etc.

Any foregoing references to currency or funds are intended to include fiat currencies, non-fiat currencies (e.g., precious metals), and math-based currencies (often referred to as cryptocurrencies). Examples of math-based currencies include Bitcoin, Litecoin, Dogecoin, and the like.

It should be noted that although the diagrams herein may show a specific order and composition of method steps, it is understood that the order of these steps may differ from what is depicted. For example, two or more steps may be performed concurrently or with partial concurrence. Also, some method steps that are performed as discrete steps may be combined, steps being performed as a combined step may be separated into discrete steps, the sequence of certain processes may be reversed or otherwise varied, and the nature or number of discrete processes may be altered or varied. The order or sequence of any element or apparatus may be varied or substituted according to alternative embodiments. Accordingly, all such modifications are intended to be included within the scope of the present disclosure as defined in the appended claims.

The foregoing description of embodiments has been presented for purposes of illustration and description. It is not intended to be exhaustive or to limit the disclosure to the precise form disclosed, and modifications and variations are possible in light of the above teachings or may be acquired from this disclosure. The embodiments were chosen and described in order to explain the principals of the disclosure and its practical application to enable one skilled in the art to utilize the various embodiments and with various modifications as are suited to the particular use contemplated. Other substitutions, modifications, changes and omissions may be made in the design, operating conditions and arrangement of the embodiments without departing from the scope of the present disclosure as expressed in the appended claims.

What is claimed is:

1. A method of authenticating a login request at a computing device, the method comprising:
   receiving, by a computing device, the login request including a user identifier associated with a user;
   transmitting, by the computing device, a request for location information of a user device associated with the user to indicate a first location of the user device;
   causing, by the computing device, the user device to execute computer-executable code that is deployed to the user device to cause the user device to:
      generate a first encoded value based on a unique identifier of the user device;
      generate a second encoded value based on the first location of the user device; and
      generate a location-based modifiable digital fingerprint comprising the first encoded value and the second encoded value, wherein the location-based modifiable digital fingerprint changes responsive to changes in location of the user device;
   detecting, by the computing device, a change in location of the user device from the first location of the user device to a second location of the user device;
   receiving, by the computing device, the location-based modifiable digital fingerprint from the user device based on the change in the location of the user device triggering the user device to change the location-based modifiable digital fingerprint;
   verifying, by the computing device, the user device based on the change to the location-based modifiable digital fingerprint including a change to the second encoded value that corresponds to the second location of the user device; and
   providing, by the computing device, the user access to the computing device.

2. The method of claim 1, wherein the login request further comprises a password associated with the user identifier.

3. The method of claim 2, further comprising verifying, by the computing device, that the user identifier and the password match a known user identifier and a known password.

4. The method of claim 1, wherein the first location of the user device is determined based on information provided by at least one of a wireless access point or a cellular transceiver in broadcast range of the user device.

5. The method of claim 1, wherein the first location of the user device is determined based on a code provided to the user device.

6. The method of claim 1, further comprising, in response to determining that the second encoded value corresponds to a third location of the user device, blacklisting, by the computing device, the user device.

7. The method of claim 6, further comprising blacklisting, by the computing device, the user device based on an IP address associated with the login request.

8. A system for authenticating a login request, the system comprising:
   a computing device comprising a processing circuit configured to:
      receive the login request including a user identifier associated with a user;

transmit a request for location information of a user device associated with the user to indicate a first location of the user device;
cause the user device to execute computer-executable code that is deployed to the user device to cause the user device to:
generate a first encoded value on a unique identifier of the user device;
generate a second encoded value based on the first location of the user device; and
generate a location-based modifiable digital fingerprint comprising the first encoded value and the second encoded value, wherein the location-based modifiable digital fingerprint changes responsive to a change in the location of the user device;
detect a change in the location of the user device from the first location of the user device to a second location of the user device;
receive the location-based modifiable digital fingerprint from the user device based on the change in the location of the user device triggering the user device to change the location-based modifiable digital fingerprint;
verify the user device based on the change to the location-based modifiable digital fingerprint including a change to the second encoded value that corresponds to the second location; and
provide the user access to the computing device.

9. The system of claim 8, wherein the login request further comprises a password associated with the user identifier.

10. The system of claim 9, wherein the processing circuit is further configured to verify that the user identifier and the password match a known user identifier and a known password.

11. The system of claim 8, wherein the first location of the user device is determined based on information provided by at least one of a wireless access point and a cellular transceiver in broadcast range of the user device.

12. The system of claim 8, wherein the first location of the user device is determined based on a code provided to the user device.

13. The system of claim 8, wherein the processing circuit is configured to, in response to determining that the second encoded value corresponds to a third location of the user device, blacklist the user device.

14. The system of claim 11, wherein the processing circuit is configured to blacklist the user device based on an IP address associated with the login request.

15. One or more non-transitory computer-readable media comprising instructions stored thereon, the instructions, when executed by a processor of a computing device, configured to cause the computing device to perform operations for authenticating a login request, the operations comprising:
receiving the login request including a user identifier associated with a user;
transmitting a request for location information of a user device associated with the user to indicate a first location of the user device;
causing the user device to execute computer-executable code that is deployed to the user device to cause the user device to:
generate a first encoded value based on a unique identifier of the user device;
generate a second encoded value based on the first location of the user device; and
generate a location-based modifiable digital fingerprint comprising the first encoded value and the second encoded value, wherein the location-based modifiable digital fingerprint changes responsive to changes in location of the user device;
detecting a change in location of the user device from the first location of the user device to a second location of the user device;
receiving the location-based modifiable digital fingerprint from the user device based on the change in the location of the user device triggering the user device to change the location-based modifiable digital fingerprint;
verifying the user device based on the change to the location-based modifiable digital fingerprint including a change to the second encoded value that corresponds to the second location of the user device; and
providing the user access to the computing device.

16. The media of claim 15, wherein the login request further comprises a password associated with the user identifier.

17. The media of claim 16, the operations further comprising: verifying that the user identifier and the password match a known user identifier and a known password.

18. The media of claim 15, wherein the first location of the user device is determined based on information provided by at least one of a wireless access point and a cellular transceiver in broadcast range of the user device.

19. The media of claim 15, wherein the first location of the user device is determined based on a code provided to the user device.

20. The media of claim 15, the operations comprising: in response to determining that the second encoded value corresponds to a third location of the user device, blacklisting the user device.

* * * * *